US 9,026,499 B1
May 5, 2015

(12) United States Patent
Rajimwale et al.

(54) SYSTEM AND METHOD FOR RECOVERING FILE SYSTEMS BY RESTORING PARTITIONS

(75) Inventors: Abhishek Rajimwale, Santa Clara, CA (US); Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/077,726

(22) Filed: Mar. 31, 2011

(51) Int. Cl.
G06F 7/00 (2006.01)
G06F 17/30 (2006.01)

(52) U.S. Cl.
CPC .... *G06F 17/30604* (2013.01); *G06F 17/30893* (2013.01)

(58) Field of Classification Search
USPC .............. 707/620, 999.101, 999.102, 674
See application file for complete search history.

(56) References Cited

U.S. PATENT DOCUMENTS

| 6,728,713 | B1 | 4/2004 | Beach et al. |
| 7,047,386 | B1* | 5/2006 | Ngai et al. ............... 711/170 |
| 7,584,338 | B1 | 9/2009 | Bricker et al. |
| 8,392,482 | B1* | 3/2013 | McAlister et al. ......... 707/899 |
| 8,495,111 | B1 | 7/2013 | Wang et al. |
| 2005/0055333 | A1* | 3/2005 | Deen et al. ................. 707/1 |
| 2006/0069692 | A1* | 3/2006 | Pernia ..................... 707/100 |
| 2007/0055703 | A1* | 3/2007 | Zimran et al. ............. 707/200 |
| 2007/0162462 | A1* | 7/2007 | Zhang et al. .............. 707/10 |
| 2008/0270729 | A1 | 10/2008 | Reddy et al. |
| 2009/0006420 | A1 | 1/2009 | Morrill et al. |
| 2009/0094252 | A1 | 4/2009 | Wong et al. |
| 2010/0246578 | A1 | 9/2010 | Zhong et al. |
| 2010/0313040 | A1 | 12/2010 | Lumb |
| 2010/0332452 | A1 | 12/2010 | Hsu et al. |
| 2011/0047132 | A1 | 2/2011 | Kilday et al. |
| 2011/0125771 | A1* | 5/2011 | Gladwin et al. ........... 707/758 |
| 2011/0153630 | A1* | 6/2011 | Vernon et al. ............. 707/758 |
| 2011/0178983 | A1 | 7/2011 | Bernhard et al. |
| 2012/0150815 | A1* | 6/2012 | Pafumi et al. ............. 707/679 |
| 2012/0173581 | A1* | 7/2012 | Hartig et al. ............. 707/781 |

OTHER PUBLICATIONS

Final Office Action, U.S. Appl. No. 13/077,781, dated Jun. 3, 2014, 15 pages.
Non-Final Office Action, U.S. Appl. No. 13/077,781, dated Aug. 17, 2012, 10 pages.
Non-Final Office Action, U.S. Appl. No. 13/077,781, dated Feb. 26, 2013, 11 pages.

(Continued)

*Primary Examiner* — Khanh Pham
*Assistant Examiner* — Eliyah S Harper
(74) *Attorney, Agent, or Firm* — Blakely Sokoloff Taylor & Zafman LLP

(57) ABSTRACT

According to one embodiment, recovering file systems by restoring partitions is described. In one example, a method includes discovering an error in a storage partition of a file storage system, the storage partition including identification metadata to identify itself to the file system, finding a backup storage partition containing data and identification metadata corresponding to that of the error storage partition, restoring the error storage partition using the backup storage partition, and using the restored identification metadata to identify the restored storage partition to the file system.

19 Claims, 10 Drawing Sheets

(56) References Cited

OTHER PUBLICATIONS

Notice of Allowance, U.S. Appl. No. 13/077,679, dated Dec. 19, 2013, 18 pages.
Non-Final Office Action, U.S. Appl. No. 13/077,781, dated Jan. 3, 2014, 9 page.
Notice of Allowability, U.S. Appl. No. 13/077,679, dated Jan. 29, 2014, 5 pages.
Final Office Action, U.S. Appl. No. 13/077,781, dated Jul. 16, 2013, 17 pages.

* cited by examiner

SYSTEM AND METHOD FOR RECOVERING FILE SYSTEMS BY RESTORING PARTITIONS

CROSS-REFERENCE TO RELATED APPLICATIONS

The present application is related to co-pending application Ser. No. 13/077,679, filed Mar. 31, 2011, entitled "Large Scale Data Storage System with Fault Tolerance", and Ser. No. 13/077,781, filed Mar. 31, 2011, entitled "System and Method for Recovering File Systems without a Replica", both assigned to the present assignee.

FIELD OF THE INVENTION

Embodiments of the present invention relate generally to large scale data storage systems. More particularly, embodiments of the invention relate to recovering file systems by restoring one of multiple partitions of the file system.

BACKGROUND

There is an ever increasing demand for building larger storage systems, driven by primary data growth and by the advent of new workloads such as disk-based backup. Backups which were traditionally stored on tapes are now being stored on disk-based storage systems for better performance and cost effectiveness. Such backup systems have huge footprints often several times larger than traditional primary storage systems and yet are unable to meet the requirements of the biggest enterprise customers.

To ease the management of a large storage system, data may be stored in such a system as a single large collection such as a file system, rather than split into multiple small disjoint sets. Similarly, for deduplicated storage, a larger de-duplication domain provides for better compression. If there are multiple small de-duplication domains in the storage, then the de-dupe rates are low, leading to more space usage. Further, with multiple small de-duplication domains, it becomes difficult to decide how to assign data to different de-dupe domains.

Unfortunately, a large single collection is difficult to backup and restore if there is a failure in the storage system. A single large storage collection presents a potential loss of the entire collection whenever a part of the storage is damaged or compromised and the time required to recover the collection can become long because of the size of the collection. In many systems, the collection must be taken off line while even a small portion of the data is being recovered. A long recovery time can render the system unavailable for a long period during the recovery.

In addition, there is an increased likelihood for a part of a large storage system to fail, because there are many more devices in the large storage system. Further, with the data and metadata of the single large collection spread across these large number of storage devices, these partial hardware failures can cause corruption of the entire collection. In such a case, the entire collection may be lost or must be taken off line to repair the data or metadata.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
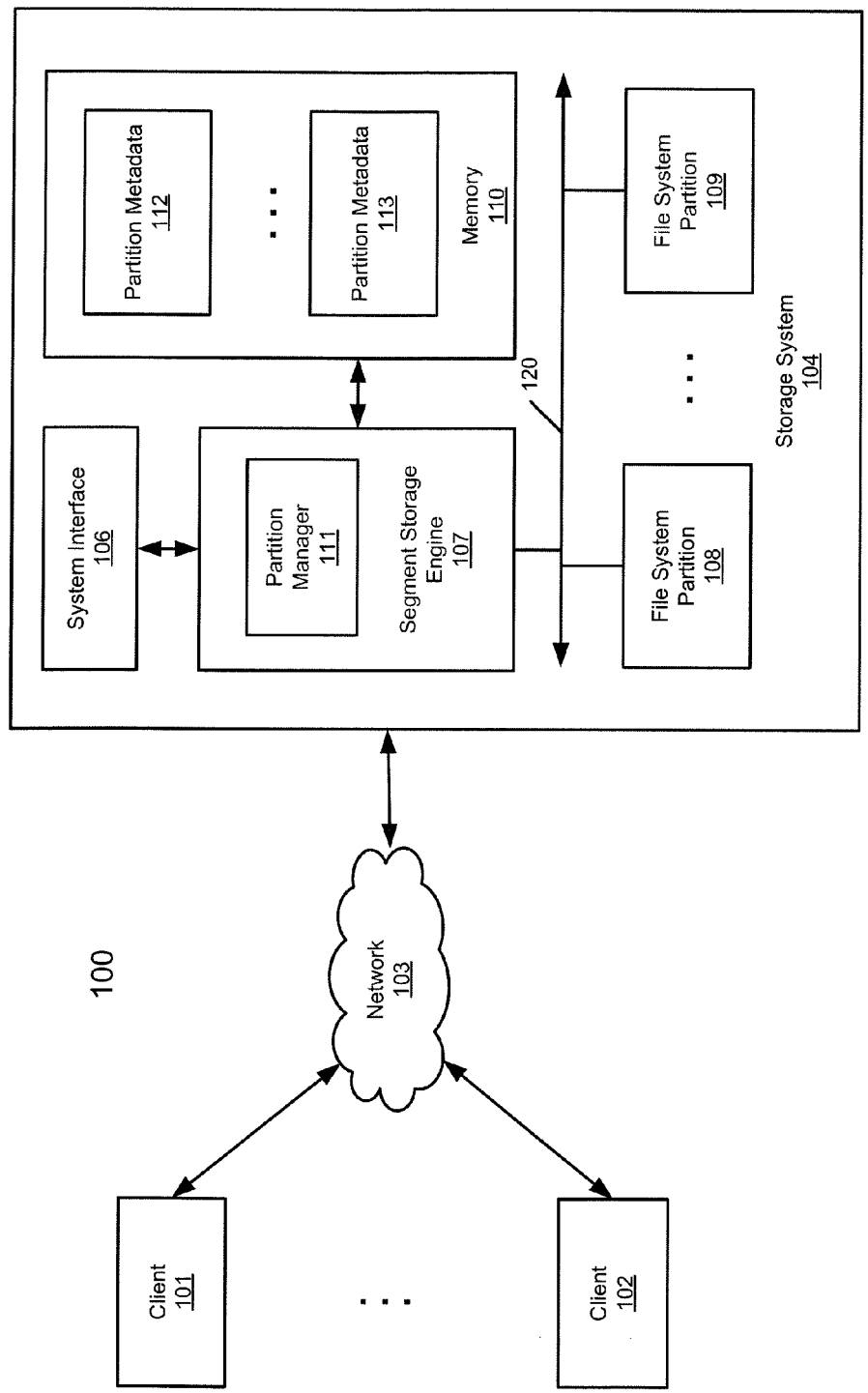
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a large scale data storage system capable of hosting one or more large data collections can be built for fault tolerance. Each large collection is composed of multiple independent, fault-contained partitions or units. When hardware failures occur in parts of the large collection, the failures are localized in the partitions having the faulty hardware and the remaining part of the collection can continue to be operational. A quick restore-at-replica recovery process can be used to recover only the affected partitions of the collection.

In some embodiments, the invention is described using an EMC Data Domain Archiver appliance, referred to as the Archiver. When partial hardware failures occur in the Archiver, in most cases the system remains operational. The Archiver generates alerts and logs error messages identifying the affected partitions. An administrator using the Archiver can request a restore-at-replica recovery procedure to quickly recover only the affected partitions.

In one embodiment, a deduplication file system is partitioned into multiple partitions as archive units, each archive unit being stored in a separate physical storage unit. Each partition includes the metadata for the entire file system or much of the entire file system including the namespace of the entire file system or much of the entire file system. As a result, each partition is self-identifying and can be individually shut down or powered up In one embodiment file systems can be recovered at or based on a replica site. A deduplication file system is partitioned into multiple partitions as archive units, each archive unit being stored in a separate physical storage unit. When one of the archive units of a primary backup site goes down, a copy of this unit can be created and configured at the replica site in part because each archive unit (and its replica) has the metadata to identify itself independently as a partition of a particular collection (file system).

This recovery of an affected unit can be done while the active unit and other functional units are still running at the primary site mainly because the file system metadata contains information about each file indentifying which partitions have segments of that file. So, when a file is accessed at the primary site, and that file has segments in the affected partition, the file system is able to report an error indicating that a specific partition having a portion of the file is not available. The file system continues to be operational and users are able to access files that do not have content in the affected partition. After the restoration of the unit is done at the replica, the replacement unit can then be shipped to the primary site. Overall, the down time can be greatly reduced because the file system is operational even when some partitions are affected and are being restored.

In one embodiment, a file system can be recovered without a replica. A deduplication file system is partitioned into multiple partitions as archive units, each archive unit being stored in a separate physical storage unit. The file system further comprises an active unit which is stored in a separate physical storage unit and is used for storing incoming data. Each unit including the active unit contains metadata for the entire file system. When the active unit goes down, a new active unit can be created from the metadata of an archive unit, without having to use the replicas of units from a replica site FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a near line storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as the de-duplication storage systems available from EMC® Corporation of Hopkinton, Mass.

In one embodiment, storage system 104 includes, but is not limited to, system interface 106, segment storage engine 107, and one or more storage units 108-109 communicatively. A file system of storage system 104 may be partitioned into multiple file system partitions, where each of the file system partitions may be stored in one of storage units 108-109. Storage units 108-109 may be communicatively coupled to each other via interconnect or bus 120, where storage units 108-109 may be physical and/or logical storage units or volumes. In one embodiment, a first of storage units 108-109 operates as an active storage unit to store fresh user data, while a second of storage units 108-109 operates as a target archive unit to periodically archive or transfer data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be written in storage units 108-109, segment storage engine 107 is configured to segment the data file into multiple segments according to a variety of segmentation policies or rules. Segment storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. In addition, partition metadata 112-113 is added to at least some of storage units 108-109, such that the file can be accessed independent of another storage unit. Data stored in the storage units may be stored in a compressed form (e.g., lossless compression: Huffman coding, Lempel-Ziv Welch coding; delta encoding: a reference to a segment plus a difference; sub segmenting: a list of sub segments or references to sub segments, etc.). In one embodiment, different storage units may use different compressions (e.g., main or active storage unit from other storage units, one storage unit from another storage unit, etc.).

Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted. Subsequently, a space reclamation process is performed to compact the remaining files to fill up entire storage units by transferring files that have not been deleted from a storage unit (e.g., a container, drive, array of drives, etc.) to a new storage unit and deduplicating segments stored in the new storage unit.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

In one embodiment, a storage system as shown in FIG. 1 may be used as a tier of storage in a storage hierarchy that comprises other tiers of storage. One or more tiers of storage in this hierarchy may utilize different kinds of storage devices and may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers comprise different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, the file system is partitioned into multiple file system partitions 108-109, where each file system partition may be stored in one of the storage units of storage system 104. Each of file system partitions 108-109 includes metadata having enough information to identify itself in a single larger logical file system represented by file system partitions 108-109. Such metadata also include enough information to allow access to its associated data. Each of file system partitions 108-109 can be swapped by partition manager 111 into a predetermined memory region of system memory 110 when it is being accessed. Similarly, each of the file system partitions can be swapped out of the predetermined memory region of the system memory by partition manager 111 when it is not being accessed. As a result, the file system partitions can be accessed using a limited amount of memory. Practically, when a file system partition is swapped into memory 110, its metadata (e.g., metadata 112-113) is actually swapped into memory 110, such that the data of the corresponding file system partition can be accessed. Throughout this application, for the purposes of illustration, when a file system partition is swapped in and out of the memory, it refers to swapping the associated metadata in and out of the memory.

In one embodiment, file system partitions 108-109 are swapped in and out of the memory 110 according to a scheduling or eviction algorithm which ensures that once a partition is loaded in memory 110, enough IO (Input and Output) requests are executed on the file system partitions before the partition is considered for swapping out. This ensures that the cost of swapping partitions is amortized across multiple IO operations. Even if there are not enough currently pending IO requests, the scheduling algorithm keeps the file system partition loaded in anticipation of potential future IO operations. The scheduling algorithm is also fair and starvation free.

In one embodiment, the file system is partitioned in a way to ensure that there is strong input and output (IO) locality, i.e., IO requests are only directed to one or a few file system partitions at a given time. In one embodiment, files are grouped into partitions based on a time attribute of the files, such as, for example, the time when they were last modified. This partitioning scheme provides better IO locality for long term backup and archival workloads. Since a file is generally a locality domain (e.g., applications usually access parts of or a whole file), by storing the entire contents of files on one file system partition, the number of file system partition swaps for accessing a file is reduced.

Figure 2:
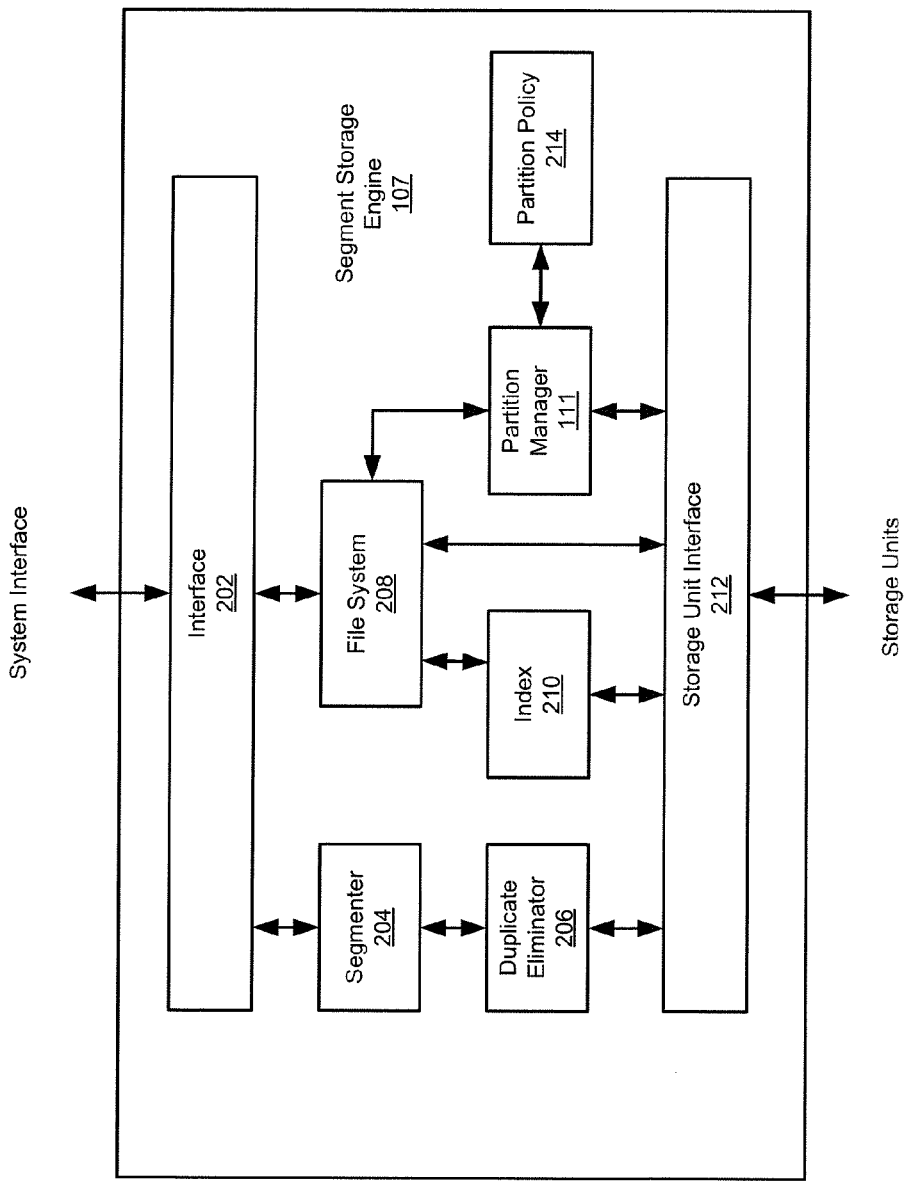
FIG. 2 is a block diagram illustrating a segment storage engine according to one embodiment of the invention.

FIG. 2 is a block diagram illustrating a segment storage engine according to one embodiment of the invention. Note that for purposes of illustration only, certain reference numbers for certain components having the same or similar functionalities from the previous figures or description may be retained the same. Referring to FIG. 2, in one embodiment, segment storage engine 107 includes interface 202, segmenter 204, duplicate eliminator 206, file system 208, index 210, and storage unit interface 212. Segment storage engine 107 receives data item(s) via interface 202. The data item(s) or file(s) is/are processed by segmenter 204 and file system 208. Segmenter 204 breaks the data item(s) into segments based on a variety of rules or considerations. For example, the data item(s) may be broken into segments by identifying segment boundaries using a content-based technique (e.g., a function is calculated at various locations of a data item, when the function is equal to a value or when the value is a minimum, a maximum, or other value relative to other function values calculated for the data item), a non-content-based technique (e.g., based on data item property for example, byte length, title, creation date), or any other appropriate technique. In one embodiment, a segment is restricted to a minimum or maximum length, to a minimum or maximum number of segments per data item, or any other appropriate limitation.

In one embodiment, file system 208 processes information to indicate the segment(s) association with a data item. In some embodiments, a list of fingerprints is used to indicate segment(s) associated with a data item. File system 208 passes segment association information to index 210. Index 210 is used to locate stored segments in storage unit(s) via storage unit interface 212. Duplicate eliminator 206 identifies whether a newly received segment has already been stored in storage unit(s). In the event that a segment has already been stored in storage unit(s), a reference to the previously stored segment is stored instead of storing the newly received segment.

Interface 202 is configured to receive a request to retrieve a data item. Interface 202 communicates with file system 208 to identify appropriate segments stored in storage units via storage unit interface 212. File system 208 communicates with index 210 to locate appropriate segments stored in storage units via storage unit interface 212. Appropriate segments are used to construct the requested data item. The data item is provided via interface 202 in response to the request. In one embodiment, file system 208 and/or index 210 use(s) a tree of content-based identifiers (e.g., fingerprints) to associate a file with data segments and their locations in storage unit(s). In the event that a segment associated with a given file or data item changes, the content-based identifiers (IDs) will change and the changes will ripple from the bottom to the top of the tree associated with a file name (or directory structure) efficiently since the appropriate content-based IDs are easily identified using the tree structure.

In one embodiment, segment storage engine 107 further includes a partition manager 111 configured to partition a file system into multiple file system (FS) partitions according to at least one partition policy 214 and to manage resources consumed by the FS partitions based on the partition policy 214. For example, partition policy 214 may include an eviction algorithm or swapping scheme to swap an FS partition in and out of a predetermined memory region of system memory. In one embodiment, when a first FS partition is not being accessed, the first FS partition may be swapped out of the memory to make room for a second FS partition that is to be accessed. As a result, the file system partitions can be accessed using a limited amount of memory. Note that some or all of the components as shown in FIGS. 1-2 may be implemented in software, hardware, or a combination of both.

Figure 3:
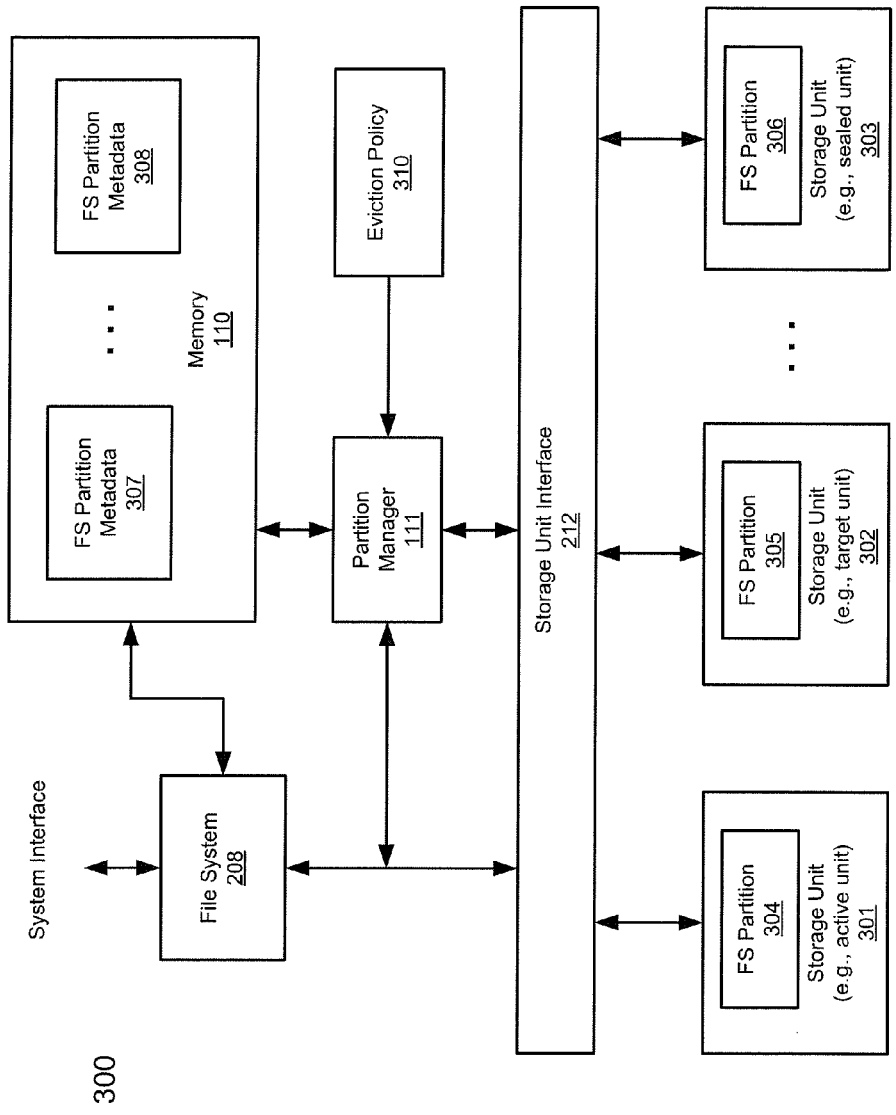
FIG. 3 is a block diagram illustrating a storage system according to one embodiment of the invention.

FIG. 3 is a block diagram illustrating a storage system according to one embodiment of the invention. For example, system 300 may be implemented as part of storage system 104 of FIG. 1. Referring to FIG. 3, storage units 301-303 may represent at least part of storage units 108-109 of FIG. 1. Storage units 301-303 may be implemented within a single computing node. Each of storage units 301-303 is identified by a storage unit ID that uniquely identifies the corresponding storage unit. Each of storage units 301-303 further contains metadata that includes enough information to access data stored therein independently. Storage units 301-303 may be physical and/or logical storage units or volumes.

According to one embodiment, system 300 represents an archiving storage system. During normal operations, external or fresh user data is written to a first storage unit, in this example, storage unit 301, which is also referred to as an active storage unit or main storage unit. Periodically, data stored in the first storage unit is migrated to a second storage unit, in this example, storage unit 302, which is also referred to as a target archive unit. When the second storage unit has been filled up to a predetermined threshold, the target archive unit is sealed to become a sealed archive storage unit, in this example, storage unit 303. Another storage unit may then be allocated and designated as a new target archive unit to archive further data from the active storage unit.

Data migration may be performed according to a variety of data migration policies. According to some embodiments, the files are stored as one or more segments, where the segments are deduplicated (e.g., only one copy is stored and can be used to reconstruct more than one file) in the storage system (e.g., deduplicated across one storage unit of the system). Segments are stored in a main or active storage unit (e.g., storage unit 301) and periodically (e.g., every week), based on a transfer protocol (e.g., storage unit is above a capacity limit, a number of segments every hour, when inactive, etc.), or when the storage unit is full or meets one or more conditions (e.g., is 80% full, is less than 20% active, has had no accesses in last hour, etc.), segments belonging to files identified based on a migration policy (e.g., files of a certain file type that have not been modified or accessed for a predetermined period of time are to be migrated, etc.) are transferred to a second storage unit (e.g., storage unit 302).

As the second storage unit is filled, metadata is transferred to the second storage unit so that the second storage unit has all the necessary information to access files in the second storage unit. The metadata enables the system to reconstruct files that are stored in the system (e.g., in the whole system, in a storage unit, etc.) and/or associated files that are stored in the system with their file names. This also allows the system to power down or reduce power of a storage unit for energy conservation or to take a storage unit off-line to upgrade a storage unit or to enable the system to be fault tolerant in that the system can operate if any given storage unit fails. When a storage unit fills, the system transfers segments from the main storage unit to another storage unit. The system can be expanded by adding storage units incrementally. Files can be accessed using the single name space providing an easy to use interface. Hardware may be efficiently used as only one deduplicating engine is used for multiple storage units.

In one embodiment, a file is identified by a name that is independent of the storage unit the file is stored in. When a file is received to be stored, a name is also received to be associated with the file. When a request to read a file is received, a name is also received. The system looks up the metadata associated with the files in the system to identify the file associated with the received name. It then looks up the metadata associated with the identified file to determine the storage unit in which the identified file is stored. In one embodiment, the metadata associated with the files in the system may be maintained in a main or active storage unit. Alternatively, the metadata may be maintained in each storage unit where the files associated with the metadata are stored. In addition, the metadata may be maintained in a distributed and/or redundant manner across many storage units (e.g., for fault tolerance). Furthermore, the metadata may be maintained in a separated storage unit or storage unit, or any other appropriate storage location.

Referring back to FIG. 3, in one embodiment, each of storage units 301-303 may store data representing a portion or partition of a file system that has been partitioned into multiple partitions 304-306, where file system partitions 304-306 collectively represent a single larger logical file system of storage system 300 (also referred to as a collection of file system partitions or a file system collection). File system partitions 304-306 are hosted within storage system 300 as a single computing node and share system memory 110. Each of the file system partitions includes metadata (not shown) having enough information to identify itself in a single larger logical file system (e.g., file system collection) represented by the file system partitions. Such metadata also include enough information to allow access to its associated data.

According to one embodiment, each FS partition of the collection file system contains metadata having enough information to enable the corresponding partition to be individually identifiable and configured. Some information is specific to the FS partition and part of the information pertains to the entire FS collection. In one embodiment, the FS collection specific information stored in the active and archive partitions may be different, while the FS partition specific information may be similar.

In one embodiment, FS partition metadata that is specific to an FS partition includes, but is not limited to, at least some of unique name of the partition, version of the partition, access state of the partition, associated container set ID, a partition universally unique identifier (UUID), an originator UUID, a non-volatile random-access memory (NVRAM) ID, a partition runtime state, and a partition sealed state.

The access state of an FS partition could be one of ENABLED, DISABLED, or PROBLEM. The container set ID includes a name of the container set within the associated FS partition, where the container set holds all the data of the FS partition. A partition UUID of an FS partition uniquely identifies the corresponding FS partition. An originator UUID uniquely identifies the originator of this partition and can be used for replication purposes. A NVRAM ID is used to identify the associated NVRAM area for the corresponding partition. A partition runtime state contains information indicating a runtime state of the partition. The partition runtime state can be one of initializing, recovering NVRAM, ready (e.g., has been mounted), opened, checking (e.g., an offline tool is accessing the partition), checked (e.g., an offline tool has completed access of the partition), unmounted, and destroyed. A partition sealed state indicates whether the corresponding partition has been sealed. If the partition has been sealed, no further write access can be performed on the partition.

In one embodiment, the above information maintained in each archive partition can be used to uniquely identify each archive partition independently. If the partition is healthy, the file system can bring the partition online. If the file system determines that the partition is not healthy, it can mark and keep the partition offline and/or put the partition in a problem state. As a result, the file system can remain online as long as the active partition is healthy. One or more archive partitions may be damaged but the file system remains available.

In addition, each FS partition further includes some metadata related to the entire file system collection. In one embodiment, such metadata includes, but is not limited to, collection partition type (e.g., active, target, or archive) and collection ID that uniquely identifies the collection of which the corresponding partition is a member. Further, metadata in each of the archive FS partitions further includes a header having a version number, sequence number, and a checksum value and a partition table. The partition table includes a collection ID identifying a file system collection of which the associated partition is a member, a number of partitions in the collection, UUIDs of all archive partitions in the collection, and a prime or prime segment representing a consistent point of the file system collection.

In one embodiment, the above information kept in the active partition helps to identify all the different partitions of the collection (file system). The file system uses this information to discover all the partitions and tries to bring them online. However, if the active partition is corrupted, the collection information is not available and the file system cannot be brought online immediately. This collection information must then be assembled by probing all the archive partitions available on the system. The archive partitions will identify themselves as part of a collection and this information from archive partitions can be used to recreate the collection information of the active partition.

In one embodiment, each of the file system partitions can be swapped into a predetermined memory region of system memory 110 by partition manager 111 as part of FS partition metadata 307-308 when it is being accessed. Similarly, each of the file system partitions can be swapped out of the predetermined memory region of the system memory by partition manager 111 when it is not being accessed. In this example, it is assumed that there are only two memory slots 307-308 allocated from memory 110 for FS partitions and there are three FS partitions 304-306. Initially, metadata of FS partitions 304-305 are loaded in memory 110 as part of metadata 307-308, respectively. Subsequently, when a request for accessing data stored in FS partition 306 is received, one of FS partitions 304-305 that is not being accessed at the moment is identified and unloaded from memory 110, such that metadata of partition 306 can be loaded into the same memory slot without having to allocate an additional memory slot. As a result, the memory usage footprint can be greatly reduced.

In the described examples, the large scale storage is made up of an aggregation of low cost storage devices, such as storage units 301, 302, 303 of FIG. 3. In some embodiments, the file system holding the entire collection of data is built on top of this aggregation of low cost storage devices or storage nodes. Partitions or "units" are created using the storage nodes. To create the partitions, a number of storage nodes are grouped into one logical entity i.e. an archive unit. As the archival file system grows in size, several such archive units can be created by simply adding additional physical storage devices and grouping them into logical archive units. Thus, the archival file system is split into multiple independent archive units holding chunks of data. In some embodiments, an Archiver is used to create the partitions to store data in the partitions and to perform backups in the event of a loss.

Since the Archiver is used for both backup and archiving, in some embodiments, it has a special logical partition called the "active" partition, such as active partition 301, that is used as the target for all backup operations. All the data that is ingested into the Archiver, first lands into this active partition. The active partition also contains the entire namespace metadata for the file system. Any user data that needs to be archived for long term cold storage is then moved from the active partition into a "target" archive unit, such as target archive unit 302, by issuing commands on the Archiver. The Archiver may be formed from components of FIG. 3 such as elements of the segment storage engine 107.

Namespace metadata may take any of a variety of different forms. In one embodiment it contains file names, directory names, and the attributes, and hierarchy of the files and directories. The namespace may also contain, thumbnails, snapshots, digests, etc. of some or all of the files. In one embodiment, the file system namespace metadata contains location information. The location information indicates where, such as in which partition, each segment of each file listed in the namespace is located. Given a file name, this metadata allows the partitions which contain its data to be identified. In the same way, given a partition name, the files that have data in that partition can be identified.

The location information may be used to isolate faults. Since each archive unit identifies itself with a unique partition UUID and the file system metadata has information about which segments of each file are present in each partition UUID, it is easy for the file system to isolate faults by identifying the files that cannot be accessed when a particular partition is unhealthy. This way, the file system remains online when a particular partition has a problem. Only the affected files are inaccessible and these affected files can be identified with the location metadata.

While in some embodiments, the entire namespace metadata is stored in the active partition, this is not necessary to the invention. The namespace data may be stored in several different partitions. A portion of the complete namespace data may be stored in the active partition, while other portions may be stored in other locations. The namespace stored in the active partition includes namespace for names outside the active partition so that this namespace can be used to contribute to recovering the entire namespace in the event of a fault.

When the target archive unit is completely filled with data, the unit is logically sealed preventing any further modifications. As a result, after time the large scale storage system will have a number of "sealed" archive units and only one "target" archive unit that is being currently used for archiving data. The sealed archive units are not written to and are read from only in the event of a fault or for restoring archived data. The sealed units are fault contained logical partitions of the single large file system.

In order to further contain faults within each partition, each archive unit is written as an independent domain of de-duplication. In other words, all the data inside the archive unit is de-duped internally but there is no de-duplication of data across different archive units. If segments or chunks of data are de-deduplicated across archive units, then a small physical data loss in one unit can result in corruption of vast amounts of data across the whole file system. By maintaining the independence of each archive unit, faults can be limited to the particular archive unit that is damaged.

To further contain faults within each partition, in one embodiment, critical metadata like the namespace information is stored in each archive unit. A snapshot of the complete file system namespace information existing at the time when the archive unit is sealed is stored in the archive unit. Upon being sealed, each archive unit contains both the self contained de-duplicated data and the complete relevant file system metadata. In one embodiment, the archive unit also contains enough information to identify itself as part of a particular file system. As a result, each archive unit is self-identifying. Should any fault occur, the fault is contained within an archive unit and the file system can easily disable access to the affected archive unit[s]. Damage is thus limited to the archive unit or units whose corresponding physical storage nodes are damaged. Only the files that have segments in the affected unit are inaccessible, and the file system continues to be operational.

When the large scale file system is partitioned into multiple independent fault-contained partitions, the file system is able to contain and tolerate most kinds of partial hardware failures. Any hardware failure will be limited to the partitions that contain the affected storage devices. The rest of the file system continues to be operational in most cases.

In some embodiments, the file system stays operational and online regardless of which partition or partitions are damaged. The only case in which the file system is taken offline is when the affected storage devices are part of the "active" partition. In the described embodiments, the active partition is the only partition that contains the current data and the current namespace data for the entire collection. Still, even the active partition can be recovered quickly using a nearby replica or the last checkpoint.

Figure 4:
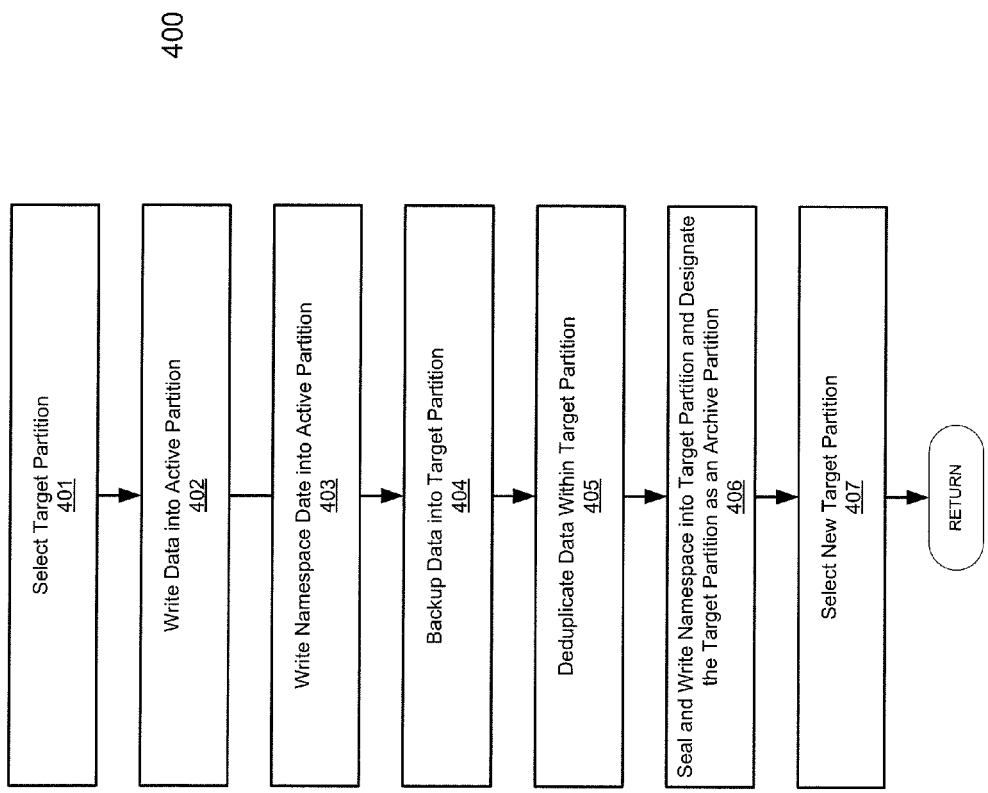
FIG. 4 is a flow diagram illustrating a method for creating a series of storage partitions according to one embodiment of the invention.

FIG. 4 is a flow diagram illustrating a method for creating a backup and archival series of storage partitions of a storage system according to one embodiment of the invention. Method 400 may be performed by system 300 of FIG. 3. Referring to FIG. 4, at block 401 one or more storage partitions are selected as target partitions. The partitions may each be formed by grouping a plurality of storage nodes into a single logical entity to form a partition. The storage nodes may be physical or logical storage devices. The system will also have an active partition as discussed above. The active partition may similarly be formed of one or more storage nodes.

At block 402 data of the large scale data store is written into the active partition. Namespace data is also written into the active partition at block 403. This is the repository for new data as it is added into the file system and the new data is accessible within this partition. The namespace data includes namespace data for files outside the active partition so that it can be used to find new and old data that may be located in the active partition or in sealed archive partitions.

At block 404, data from the active partition is backed up into the target partition. This may be performed continuously as the data is written into the active partition or at specific intervals, or at a single point in time after the amount of data in the active partition has reached a threshold. The target partition, in this way, is used as a backup storage partition from which the most current data can be recovered. In one embodiment, the Archiver tracks current file system operations and manages the data that is to be written into the target partition.

At block 405, the data in the target partition is deduplicated. This can be done as the data is written or after the target partition is nearly full. In order to contain any eventual faults within the target partition, the data is deduplicated within the target partition but not across other partitions. As a result, if there is a fault in another partition, the target partition will not lose access to any necessary files. Similarly, the target partition will not require reference to any other partition to regenerate its own files from the deduplicated files.

At block 406, the target partition is sealed against addition data writes. In one embodiment, this is done by writing an identifier to the target partition. At about the same time, the namespace data is written to the target partition. In one embodiment, this is a copy of the complete namespace metadata of the target partition. The namespace data can be written as metadata and may be written as the target partition is filled. When the target partition is completely filled, then the metadata can be updated. In one embodiment, the namespace metadata is written only after the target partition has been filled.

In one embodiment, the namespace metadata includes the entire namespace for the large scale data store. All of this is written into the target partition allowing the entire namespace to be recovered from a single location. This allows any recovery to be performed more quickly. Upon sealing, the target partition contains some amount of archived data and the complete namespace metadata that is current at the time that the partition is sealed. The target partition after being sealed can now be designated as an archive partition. In one embodiment, the physical partition that was used as the target partition is sealed and designated as an archive. In another embodiment, the contents of the target partition are physically copied into a different physical partition as the new archive partition. Both occurrences may be referred to as designating the logical target partition as a logical sealed partition.

At block 407, a new target partition is selected for connection to the active partition and the process may be repeated using a new target partition. The new target partition will be used until it is filled and it will then be sealed as described above.

Having sealed the target partition, the Archiver is ready to continue writing backup data. In one embodiment, the target partition is designated as an archive partition and a new partition is selected and designated as the target partition. The process flow then repeats with new data being backed up to the new active partition. In another embodiment, the target partition is backed up to a data archive, flushed or emptied and then made ready to repeat the process continuing to act as the target partition. In other words, when at block 401, a target partition is selected, this partition may be a new partition or the same partition after it has been written out to an archive partition. In the first case, the process writes new data of the large scale data store to a partition that is not sealed. The new partition becomes a new target partition. In the second case, sealing the data comprises copying the data to a second partition and writing an identifier to the second partition.

In any event, for additional security, the sealed target partition is further backed up. The sealed target partition, now an archive partition, is backed up to a separate data archive, such as an off-site, remote replica.

In one embodiment, when data is replicated to a remote replica, the file system on the primary site first sends the partition information to the remote file system. At the replica, the file system ensures that the Archiver configuration is similar to that of the primary site, for example, the file system checks the number of partitions and the sizes of the partitions to check if they match the source site. Replication proceeds if the configuration on the two sites matches. In one embodiment, any mismatch in the configuration is logged by the file system and reported to the administrator. This ensures that the fault contained partitions are similar on both the primary and replica sites, thus facilitating partial dataset recovery.

Figure 5:
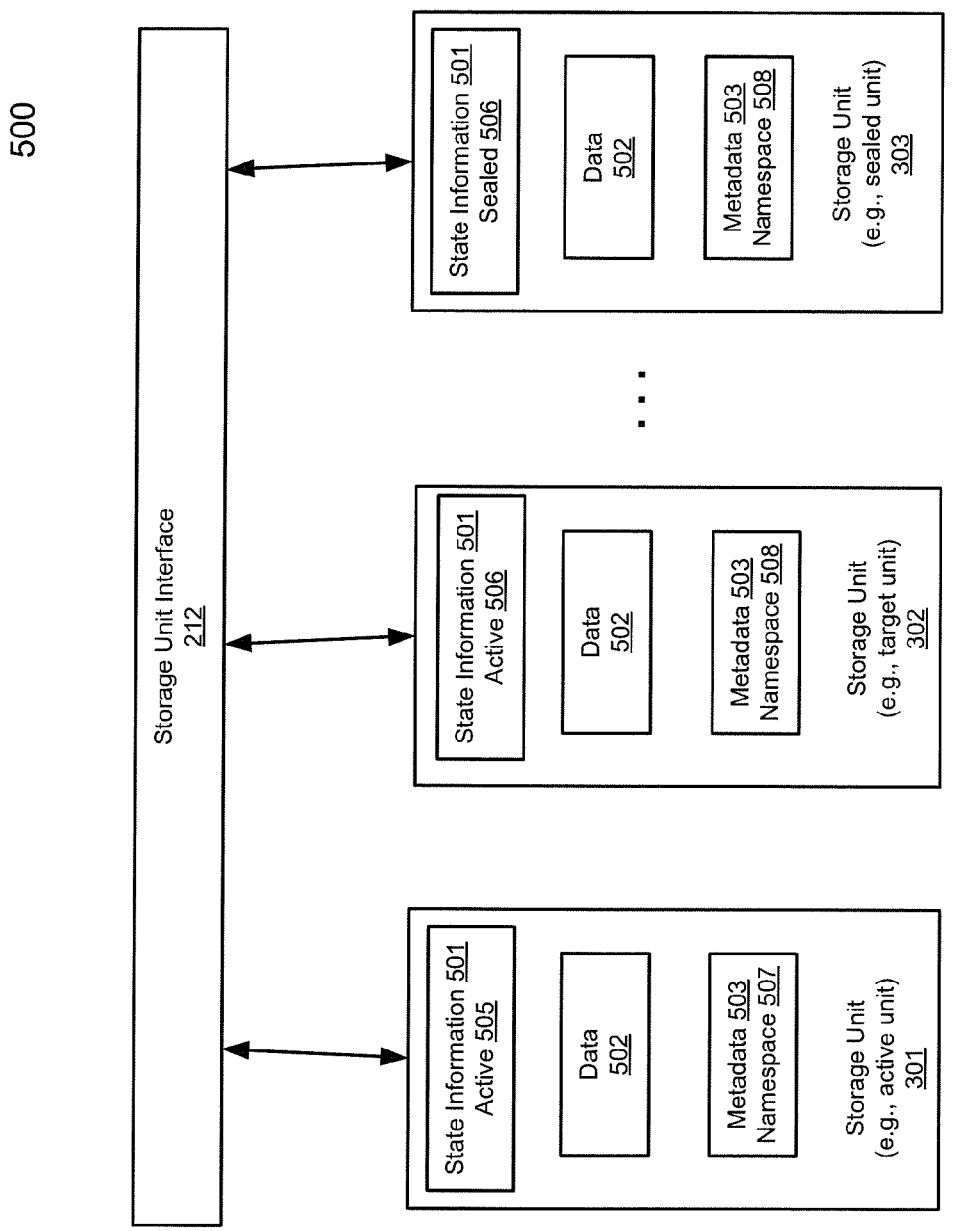
FIG. 5 is a block diagram illustrating a fault contained file system partitions of a storage system according to one embodiment of the invention.

FIG. 5 is a diagram of a series of fault-contained partitions according to one embodiment of the invention. In FIG. 5, three partitions 301, 302, 303 are coupled to a storage unit interface 212, as in FIG. 3. There may be more or fewer partitions, however, only three are shown. Each partition includes state information 501, data 502, and metadata 503. The state information is discussed above and may include partition identifiers, versions, and state information for each partition. The state information allows each partition to be self-identifying. In particular, in one embodiment, the state information indicates whether a partition is active or sealed. The first and second partitions 301, 302 are active partitions as indicated by their active state information 505. The third partition 303 is a sealed state partition as indicated by its sealed state information 506.

The data 502 is data that is backed up for the file storage system. In one embodiment, each partition stores different data and the data is deduplicated only within each partition. For the first partition, the active partition, the most current data is stored. For the second partition, the target partition, the data from the active partition is backed up into it. The third partition is sealed against receiving any more data, so this partition contains earlier data. No additional data will be added to the third partition.

The metadata 503 includes a copy of the namespace at some point in time. In the active partition 301, the namespace 507 is the current version. In the target partition 302, the namespace data is the current version or close to a current version of the namespace. This namespace metadata will be updated to the most current version before the partition is sealed. For the sealed partitions, the namespace metadata 508 is the namespace that was current at the time that the third partition was sealed.

The partitioning of the file system by the Archiver into fault-contained units enables the file system to recover from failures smartly and quickly. In one embodiment, when failures occur in parts of the Archiver, the file system generates system alerts and detailed error reports in the log files about the nature of the failure. The reports can be easily examined by the system administrator to understand what recovery procedure needs to be started on the Archiver.

This intelligent and quick recovery is aided by the ability of the file system to identify and limit the scope of failures into a small subset of data on the Archiver. Permanent hardware failures are limited to the partitions or units with the failed hardware. Since each partition in the file system is made up of separate hardware storage nodes, the hardware failures are limited to the affected partitions. For example, failure of a single shelf (aggregation of RAID-6 disk arrays), is limited to the partition that includes the failed shelf. This may be a single archive unit or the active unit, depending on where the failed shelf resides.

As mentioned before, in one embodiment, when a partial hardware failure occurs, the file system generates an alert and logs the error messages identifying the archive unit (or the target or active partition) that has been affected. Depending upon the extent of the failure, the administrator can then initiate a recovery procedure. Any of a variety of different recovery procedures may be used. In one embodiment, complete recovery, or disaster recovery, provides for recovery from a remote replica site. In another embodiment, partial recovery allows only the affected partitions to be recovered from the remote replica site. In another embodiment, a limited recovery is provided for when there is no replica site available. Any one or all of these alternatives may be available, depending on the particular circumstances.

A complete recovery in the Archiver may be the best choice when the entire file system is damaged. This may be caused, for example, by a natural disaster, or a building or infrastructure failure. In this case the data can be recovered from the replica site. The Archiver may provide automatic recovery from the replica site over any of a variety of different connections, including a WAN (Wide Area Network), MAN (Metropolitan Area Network) or LAN (Local Area Network). In a typical example, the administrator replaces the damaged hardware and then invokes a specified procedure for automatic recovery from the replica. Alternatively, the replacement hardware is configured at the replica site using a local connection and then shipped to the site of the damage in a recovered condition. The recovery connection can be used to ensure the integrity of the data from the replica data.

Partition recovery may be used when only a small part of the local data archive is damaged. In a partition recovery, in one embodiment, the affected partitions are recovered quickly from the replica site, while the file system on the primary site continues to be operational. In the event that the active partition is damaged, then in some embodiments, the file system may be taken offline for the time it takes to recover the data in that single active partition. However, measures can be taken in the hardware design of the active partition to reduce the types of circumstances for which the file system must be taken off line even for a hardware failure in the active partition.

In one embodiment, the Archiver provides a partial dataset recovery from the replica at the replica site. Consider a file storage configuration in which, each partition or archive unit in the Archiver can be up to 140 TB in physical capacity. Recovering this amount of data over slow WAN links may take several days or weeks. Instead, of recovering the data over the WAN link, data media containing the recovered data can be physically shipped from the replica site.

In one example, for a restore-at-replica site process, the administrator first finds the affected partition from the file system logs. Then, a support request is issued to recover the affected partition. Instead of shipping the required storage shelves to the primary site, the required number and type of storage shelves are first shipped directly to the replica site. In one embodiment, the service and hardware orders can be determined based on the file system logs.

Once the hardware arrives at the replica site, the file system at the replica site can be used to re-create the partition or archive unit locally on that site. The data is accordingly fully restored to the new storage hardware. In one embodiment, this recovery process is primarily automatic, using the Archiver and the file system logs which can be transferred over the WAN.

The storage shelves with the re-created partition can then be shipped to the primary site. When the shelves are attached at the primary site, the file system automatically discovers the unit, and the file system is able to provide access to the data in the affected partition.

The above-described restore-at-replica site process of recovery may be much faster than existing methods of recovering large scale cold data storage from failures and corruption. By using fault-contained partitions, the archive file system can be maintained in operation, while the recovery process continues in the background. The file storage system can continue to back up to the active partition while only the data in the damaged partition is unavailable during the recovery process.

The Archiver in the described embodiments relaxes the conventional global de-duplication policy and makes each partition a separate domain for de-duplication. By keeping additional file system metadata and making each partition independent and fault-contained, each partition can be restored separate and apart from any other partition. This allows the file system to speed up the recovery process and remain online during recovery. In many conventional systems, to keep the storage costs low, the archiving solutions relies on global de-duplication across the whole collection of data in order to achieve high compression. This renders each subset of the data dependent on the rest of the data for recovery purposes.

Figure 6:
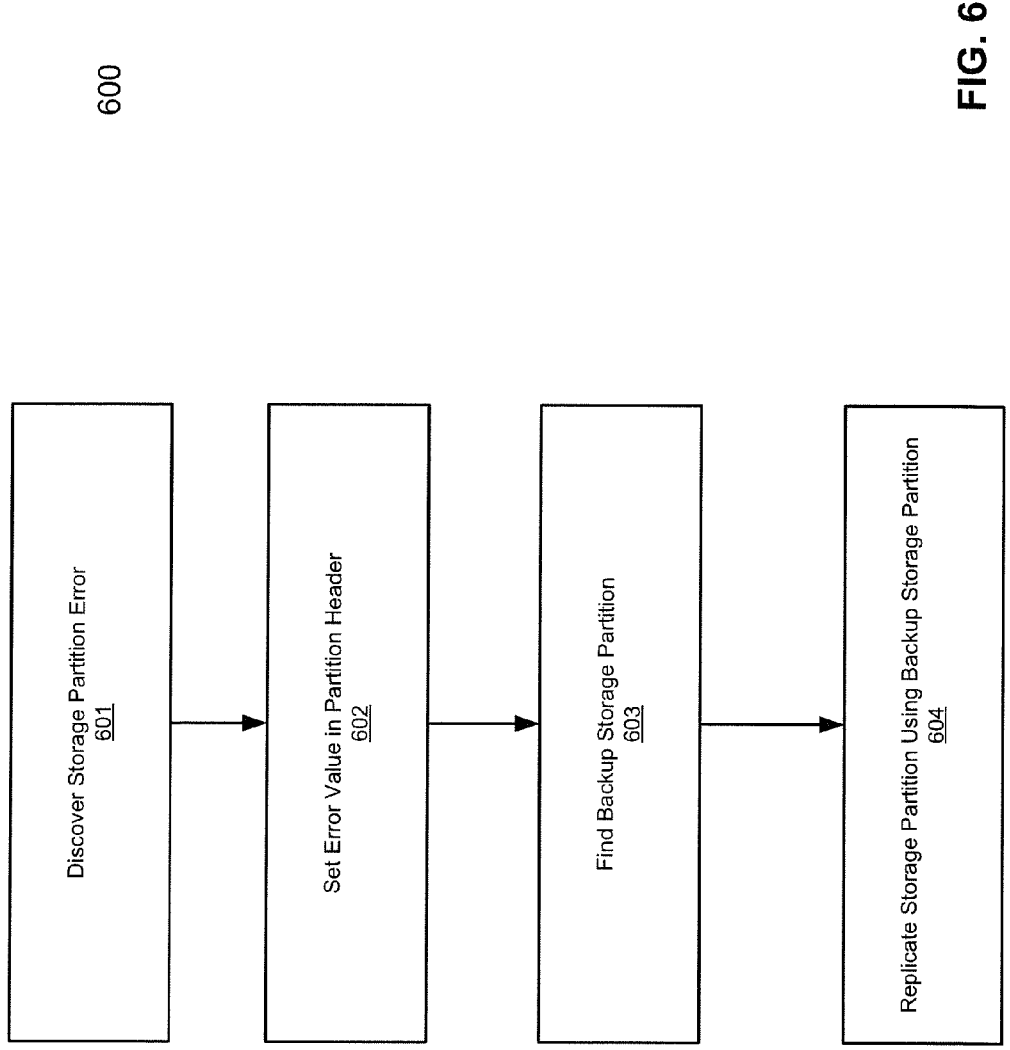
FIG. 6 is a flow diagram illustrating a method for recovering a failed partition of a storage system according to another embodiment of the invention.

FIG. 6 is a flow diagram illustrating a method for recovering a failed partition of a storage system according to one embodiment of the invention. Method 600 may be performed, for example, by system 300 of FIG. 3. Referring to FIG. 6, at block 601, an error is discovered in a storage partition of a dedupe large scale file storage system, such as that of FIG. 1. In one embodiment, this is done by the partition manager which monitors the condition of each storage partition. In another embodiment, each partition has a condition monitor that sends an alert when it detects a failure or error in its monitored system. The monitored condition alert is received by the partition manager and a log is generated to record the location and type of error. In some embodiments, the log may identify the partition and even the particular part of the partition that is experiencing the error. The log may also identify the nature and severity of the error.

At block 602 an error value is set in a header of the respective partition. As described above, in one embodiment, each partition includes state information that identifies the partition as active or archive, for example. This state information can also include information that the partition has an error state. Such an identifier can be set, for example, as part of the partition runtime state, described above.

At block 603, a backup storage partition is found that contains data corresponding to that of the storage partition identified as experiencing the error. In one embodiment, this backup partition is a replica partition at a remote replica site. In another embodiment, the backup partition is a local backup. In another example, the backup partition is a primary storage location. The backup partition can be identified by the Archiver using the namespace and archive information.

At block 604, the storage partition that experienced the error is restored using the backup storage partition. Unless the partition with the error is the active partition, the recovery can be performed while the system is operational. As described above, the active partition can easily be identified by reading an identifier of the error storage partition to determine if the error storage partition is an active storage partition. In one embodiment, this identifier is a part of the state information 501 of the partition as shown in FIG. 5.

In some implementations, there may not be a backup copy of the damaged or failed partition. This may occur because of a failure in the backup or because a backup was not made to reduce the cost of the implementation. If, for example, a single Archiver is installed on the site without a secondary replica, there may not be a complete replica or any replica of the active partition. Nevertheless a portion of the system can still be recovered.

In one embodiment, a limited recovery of the namespace of the active partition can be made. In some embodiments, all the namespace information for the entire file system resides on the active partition, any corruption or physical damage to the storage holding the active partition can cause the namespace information to be lost or corrupted. This can cause the entire file system to be non-functional. However, even if there is no current backup copy of the namespace, using the archiving process of FIG. 4, copies of the namespace are available. The target partition may contain a recent copy of the namespace and each sealed partition contains a snapshot of the namespace taken when the archive unit was sealed. The most recent of these can be used to restore the namespace to a prior condition.

In the process of FIG. 4, whenever an target unit is filled up with data and finally sealed, a current point-in-time copy of the namespace of the entire file system is stored in the target unit as an archive unit. Should the active partition get damaged, the namespace can be restored from the copy in the most recent sealed archive unit. This provides an ability to revert back to the point in time when the last archive unit was sealed.

In one embodiment, this limited recovery to only a prior version of the namespace is used only when there is no replica of the active partition available, for example in the target unit or some other namespace storage, and the active partition is lost or corrupted. Using this limited recovery, not only are the most recent revisions to the namespace lost, the data on the active partition is also lost. In another embodiment, the active partition is backed up at frequent intervals to the target unit and/or another unit, and, in the event of a failure of the active partition, it is completely restored from the backup.

Figure 7:
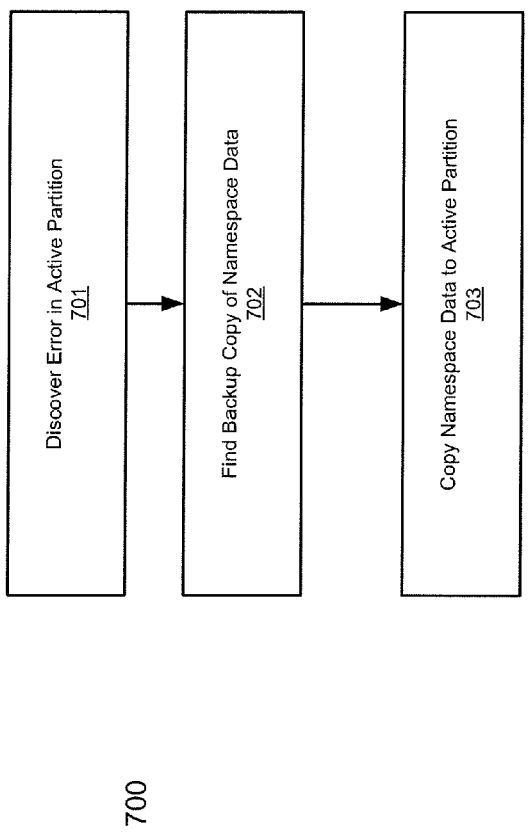
FIG. 7 is a flow diagram illustrating a method for performing a limited recovery of an active partition of a storage system according to another embodiment of the invention.

FIG. 7 is a flow diagram illustrating a method for performing a limited recovery of an active partition according to one embodiment of the invention. Method 700 may also be performed by system 300 of FIG. 3. Referring to FIG. 7, at block 701, an error is discovered in an active partition of a dedupe file system. As with FIG. 6, the error may be reported by the partition directly or discovered by a partition manager. As with FIG. 6, there are a variety of different ways to detect errors in a partition and any one or more of them may be used in the present example. In one embodiment, the error is logged and a system alert is generated.

At block 702, a search is made for a copy of the namespace data. In one embodiment, the Archiver has a record of all of the partitions and the nature of the data located on each. In addition, each partition is self-identifying using its own state information and metadata. In some embodiments, finding a partition containing a most recent copy of the namespace data can be done using a table lookup. In this example, the namespace data will not be exactly the same as that of the active partition but will be a recent copy At block 703, the found copy of the namespace data is copied to the active partition with the error or to a new partition created to replace the active partition that has the error. In one embodiment, the found copy is the most recent copy of namespace data. The found copy is a prior version of namespace data from the sealed partition. In one embodiment, the copying is done by copying the namespace data to a replacement storage partition and designating the replacement storage partition as the new active partition.

In order to improve the newly restored namespace data, it may be pruned. If the active partition is significantly damaged, and the files on the active partition cannot be restored, then the true global namespace should be changed to reflect the loss of those files. If the global namespace include files that were lost, then later errors may occur. Accordingly, in a separate process, the global namespace that is copies onto the new active partition can be checked for any of the files that have been lost. If these files are removed from the global namespace that is copied to the new partition, then those namespace errors can be avoided. In addition to files that are lost, the pruning can include files only a portion of which were lost. These files would have some portion on the error drive and other portions on other drives. Since the complete file can no longer be successfully recovered the entire file name in the namespace can be deleted.

Figure 8:
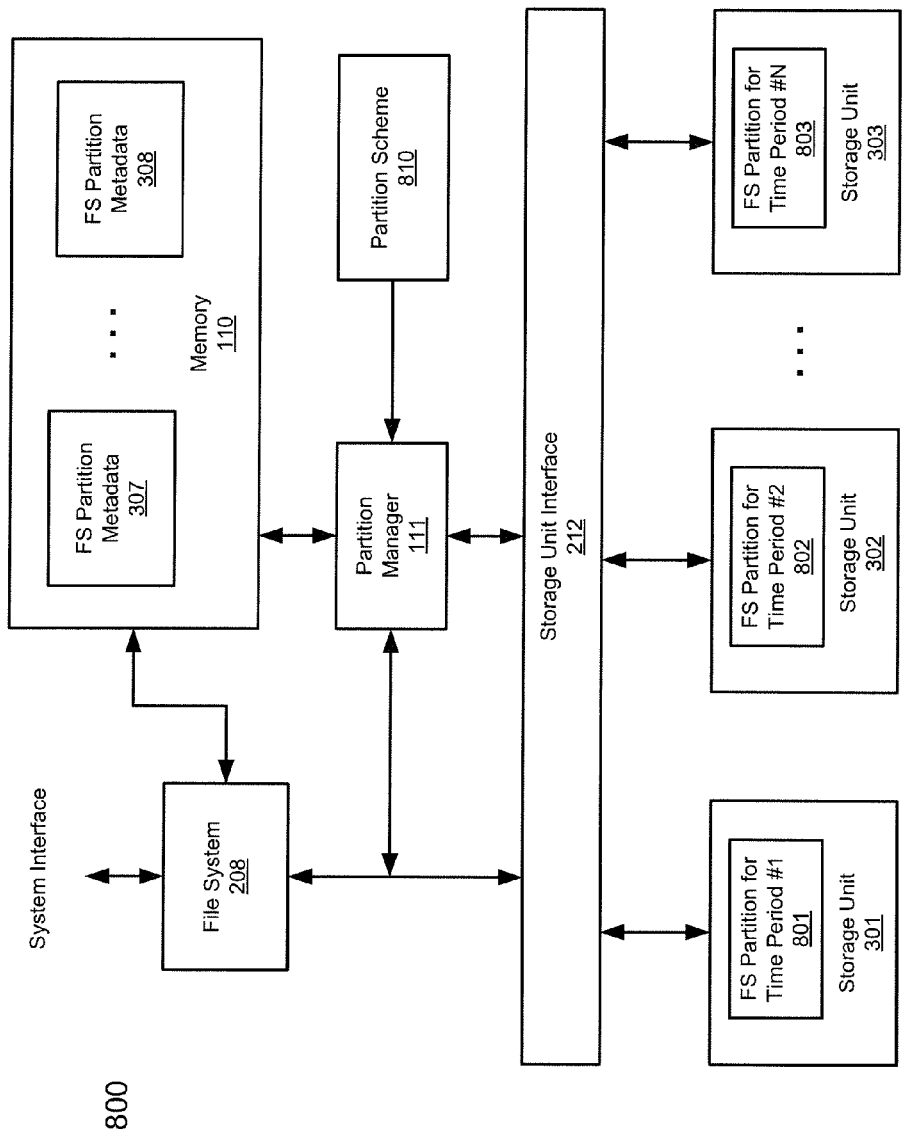
FIG. 8 is a block diagram illustrating a storage system according to another embodiment of the invention.

FIG. 8 is a block diagram illustrating a storage system according to another embodiment of the invention. For example, system 800 may be implemented as part of storage system 104 of FIG. 1. Referring to FIG. 8, similar to system 300 of FIG. 3, storage units 301-303 may represent at least part of storage units 108-109 of FIG. 1. Storage units 301-303 may be implemented within a single computing node. Each of storage units 301-303 is identified by a storage unit ID that uniquely identifies the corresponding storage unit. Each of storage units 301-303 further contains metadata that includes enough information access data stored therein independently. System 800 further includes partition manager 111 having the same or similar functionality of the partition manager as shown in FIG. 3. For example, partition manager 111 is configured to swap any one of FS partitions 801-803 in and out of memory 110 as part of FS partition metadata 307-308 according to a swapping or eviction scheme, such as a token-based scheme as described above, such that resources utilized can be managed in an efficient manner.

According to one embodiment, when a file is to be written to one of FS partitions 801-803 of storage units 301-303, the file is written to a FS partition that is selected based on partition scheme 810, such as, for example, based on an access pattern of the file. In one embodiment, the file may be written to an FS partition based on a time attribute of the file. That is, files stored in an FS partition may have been accessed in a similar time frame. Since FS partitions 801-803 are defined or grouped based on a time attribute of the files, each of FS partitions 801-803 is literately associated with a specific time period. Because files created around the same or similar time frame are likely to be accessed together as compared to files created distant time apart, when files are accessed, fewer FS partitions will need to be swapped in and out from memory 110.

A time attribute of a file used for partitioning can be any one of a last access time attribute, a last modified time attribute, and a last status change time attribute of a data structure associated with a file. The data structure may be part of a standard file system data structure or any specialized file system structure. The data file structure may include, for example, ownership of the file, access permission for the file, size of the file, file type and references to locations on disk of the data blocks for the file. The references to the locations of the file data may be provided by pointers, which may further reference indirect blocks that, in turn, reference the data blocks, depending upon the quantity of data in the file.

Referring back to FIG. 8, according to one embodiment, system 800 is an archiving system, where fresh user data is normally written to storage unit 301 as an active storage unit. Data stored in storage unit 301 may be migrated to storage unit 302 as a target archive storage unit. When storage unit 302 fills up, storage unit 302 will be sealed and becomes a sealed archive storage unit 303 (e.g., read-only storage unit). Another storage unit is allocated to be the new target archive storage unit. According to one embodiment, during the data migration, files stored in an active storage unit (e.g., storage unit 301) are scanned based on a time attribute (e.g., last modified time attribute) of the files and are transferred to a target archive storage unit (e.g., storage unit 302), such that files stored in the target archive storage unit were last modified in a similar time frame.

Figure 9:
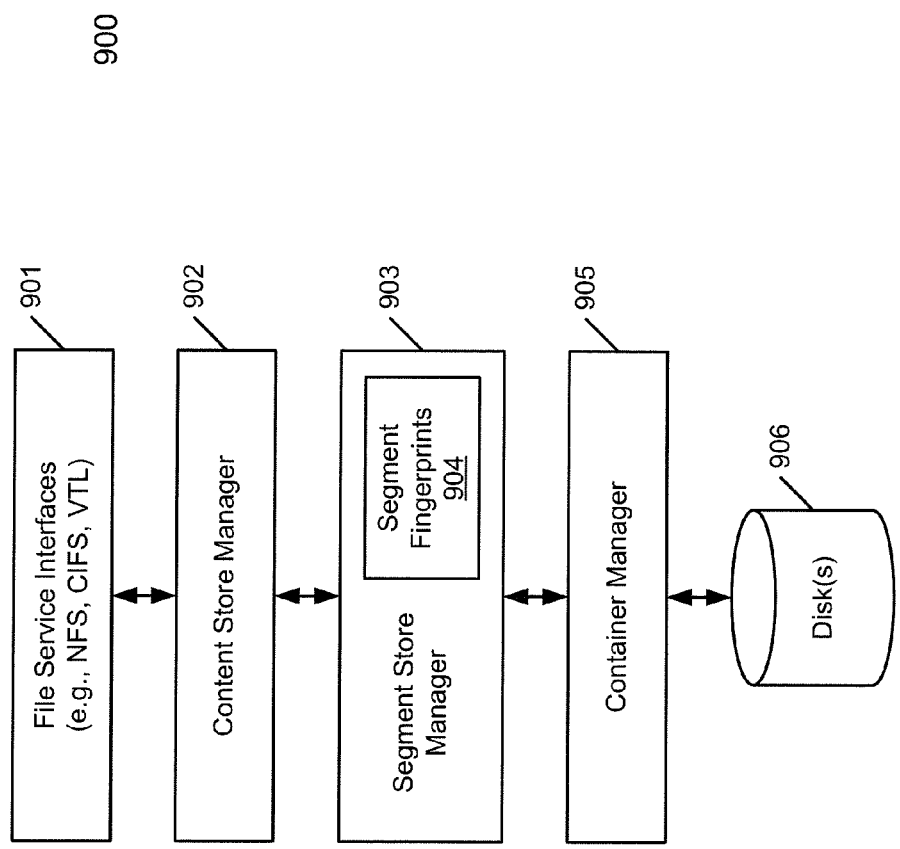
FIG. 9 is a block diagram illustrating an example of a data storage system which may be used with an embodiment of the invention.

FIG. 9 is a block diagram illustrating an example of a data storage system which may be used with an embodiment of the invention. For example, system 900 may be implemented as part of a storage system as shown in FIG. 1. In this example, system 900 is a deduplicating data storage system. Referring to FIG. 9, system 900 includes, but it is not limited to, file service interface 901, content store manager 902, segment store manager 903 having segment fingerprints 904, and container manager 905 for managing segments stored in containers in disk or disks 906.

According to one embodiment, system 900 breaks a data object (e.g., a file) into variable-length segments in a content dependent manner and computes a fingerprint for each segment. System 900 uses the fingerprints both to identify duplicate segments and as part of a segment descriptor used to reference a segment. It represents files as sequences of segment fingerprints. During writes, system 900 identifies duplicate segments and does its best to store only one copy of any particular segment. Before storing a new segment, system 900 may use a variety of compression algorithms, such as a variation of the Ziv-Lempel algorithm, to compress the segment. In one embodiment, system 900 supports multiple access protocols which are layered on a common file services interface 901. Supported protocols include a network file system (NFS), a common Internet file system (CIFS), and a virtual tape library interface (VTL), etc. System 900 includes an administrative interface for managing the system. The administrative interface may be a part of file services interface 901.

When a data stream enters system 900, it goes through one of the standard interfaces to the generic file services layer, which manages the name space and file metadata. The file services layer forwards write requests to content store manager 902 which manages the data content within a file. Content store manager 902 breaks a data stream into segments, uses segment store manager 903 to perform deduplication, and keeps track of the references for a file (e.g., mapping between logical data objects and physical data objects). Segment store manager 903 does the actual work of deduplication. It packs deduplicated (unique) segments into relatively large units, compresses such units using a variation of compression algorithms, such as a Ziv-Lempel algorithm, to further compress the data, and then writes the compressed results into containers managed by container manager 905.

To read a data stream from system 900, a client drives the read operation through one of the standard interfaces and the file services layer 901. Content store manager 902 uses references to deduplicated segments to deliver the desired data stream to the client. Segment store manager 903 prefetches, decompresses, reads and caches data segments from container manager 905. According to one embodiment, content store manager 902 implements byte-range writes and reads for deduplicated data objects, where an object is a linear sequence of client data bytes and has intrinsic and client-settable attributes or metadata. An object may be a conventional file, a backup image of an entire volume or a tape cartridge.

Figure 10:
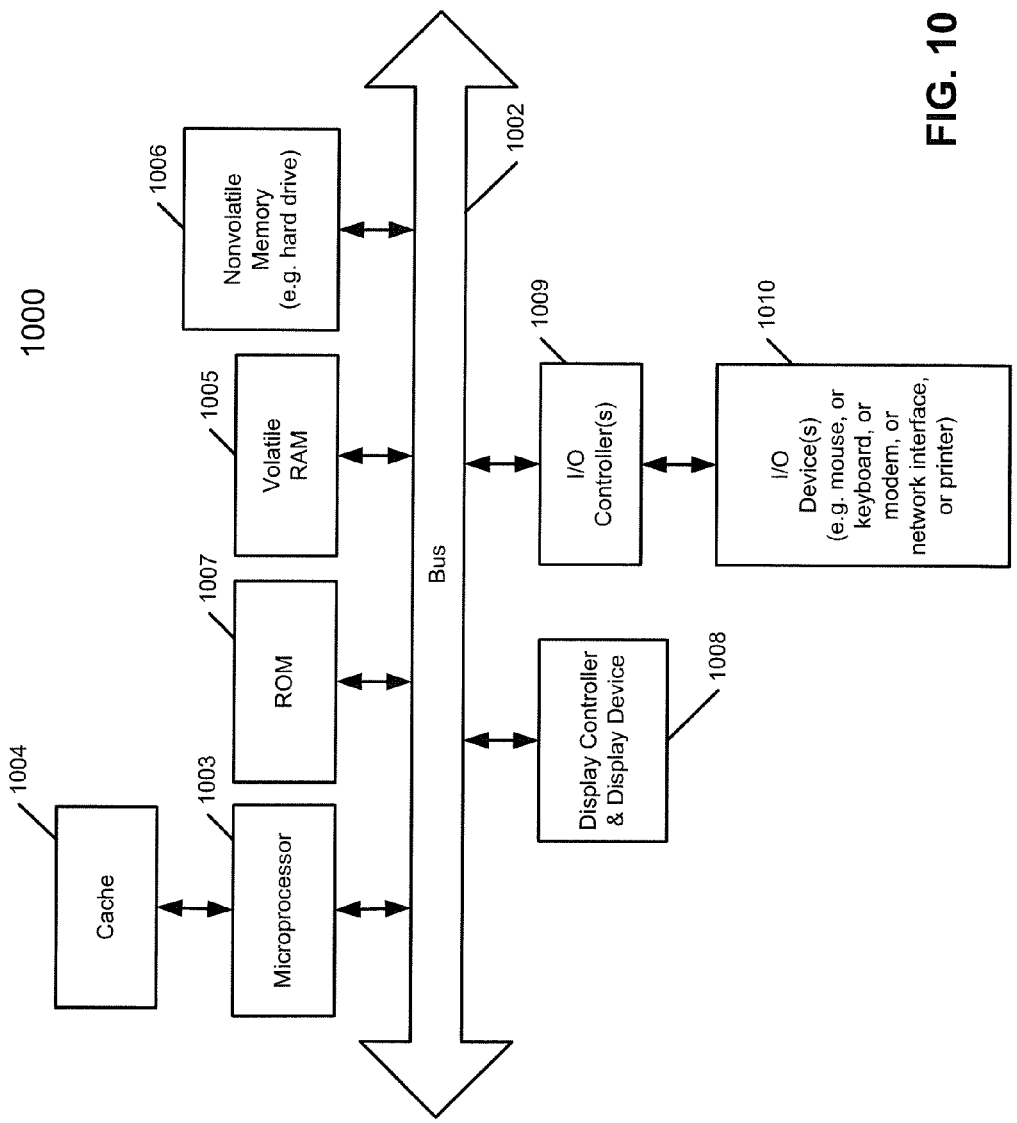
FIG. 10 is a block diagram of a data processing system which may be used with one embodiment of the invention.

FIG. 10 is a block diagram of a data processing system which may be used with one embodiment of the invention. For example, system 1000 may be used as a client or server computer as shown in FIG. 1. Note that while FIG. 10 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 10 may, for example, be an Apple Macintosh computer or an IBM compatible PC.

As shown in FIG. 10, the computer system 1000, which is in a form of a data processing system, includes a bus or interconnect 1002 coupled to a processor 1003 and a ROM 1007, a volatile RAM 1005, and a non-volatile memory 1006. Processor 1003 may include multiple processors and/or core logics that constitute central processing units (CPUs) of the system and thus, control the overall operations of the system. According to certain embodiments, processor 1003 accomplishes this by executing software stored in any of the memories 1005-1007, such as, for example, applications and operating system, etc. Processor 1003 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 1003, which may be, for example, an Intel processor or a PowerPC processor, is coupled to cache memory 1004 as shown in the example of FIG. 10. The bus 1002 interconnects these various components together and also interconnects these components 1003 and 1005-1007 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices. Other components may also be included.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method for recovering a file system, the method comprising:

discovering an error in a storage partition of a file storage system, the storage partition including identification metadata to identify itself to the file system, the error indicating that the storage partition having a portion of the file system that is not available, wherein the file storage system is a deduplicated file storage system that stores a reference to a previously stored data segment upon receiving a new data segment when the new data segment has already been stored in the file storage system;

finding a backup storage partition containing data and identification metadata corresponding to that of the error storage partition, wherein the backup storage partition is among a plurality of storage partitions to find the backup storage partition containing the data and identification metadata, wherein the identification metadata is used to identify backup storage partition corresponding to that of the error storage partition, and wherein the error storage partition and the backup storage partition can be individually shut down or powered up;

restoring the error storage partition using the backup storage partition; and using the restored identification metadata to identify the restored storage partition to the file system.

2. The method of claim 1, further comprising, prior to discovering the error in the storage partition, making the found backup storage partition including writing identification metadata to the backup storage partition.

3. The method of claim 2, wherein the backup storage partition is located at a replica site having a second replica file storage system coupled to the file storage system through a network and wherein making the backup storage partition includes sending data to be written to the backup storage partition over the network to the replica file storage system.

4. The method of claim 1, further comprising setting an error value in a header of the error storage partition after discovering the error.

5. The method of claim 1, further comprising generating an alert and logging an error message identifying the error storage partition.

6. The method of claim 1, wherein restoring the error storage partition includes making a copy of the backup storage partition including the identification metadata and installing the copy in place of the error storage partition.

7. The method of claim 3, wherein the backup storage partition is located at a different backup or replica site and the copy of the backup storage partition is made at the backup or replica site.

8. The method of claim 7, further comprising transporting the copy of the backup storage partition from the backup or replica site to be installed in place of the error storage partition.

9. The method of claim 1, wherein the storage partition includes namespace metadata identifying files of the file storage system in the storage partition and in other storage partitions and wherein restoring the error partition includes restoring the namespace metadata.

10. A non-transitory computer-readable storage medium having instructions stored therein, which when executed by a computer, cause the computer to perform a method for configuring storage partitions of a file storage system, the method comprising:

selecting a storage partition as a target partition;

discovering an error in a storage partition of a file storage system, the storage partition including identification metadata to identify itself to the file system, and the error indicating that the storage partition having a portion of the file system that is not available, wherein the file storage system is a deduplicated file storage system that stores a reference to a previously stored data segment upon receiving a new data segment when the new data segment has already been stored in the file storage system;

finding a backup storage partition containing data and identification metadata corresponding to that of the error storage partition, wherein the backup storage partition is among a plurality of storage partitions to find the backup storage partition containing the data and identification metadata, wherein the identification metadata is used to identify backup storage partition corresponding to that of the error storage partition, and wherein the error storage partition and the backup storage partition can be individually shut down or powered up;

restoring the error storage partition using the backup storage partition; and using the restored identification metadata to identify the restored storage partition to the file system.

11. The non-transitory computer-readable storage medium of claim 10, wherein the method further comprises setting an error value in a header of a respective partition after discovering an error.

12. The non-transitory computer-readable storage medium of claim 10, wherein the method further comprises reading an identifier of the error storage partition to determine if the error storage partition is an active storage partition and if the error storage partition is an active storage partition, then taking the active storage partition offline before replicating.

13. The non-transitory computer-readable storage medium of claim 10, wherein the backup storage partition is located at a different site and restoring the error storage partition is performed at the different site.

14. The non-transitory computer-readable storage medium of claim 13, wherein the error storage partition comprise a plurality of storage nodes grouped into a single logical entity to form a partition.

15. A storage system comprising;

a system memory;

a file system executed in the system memory, the file system having a plurality storage partitions, each storage partition including identification metadata to identify itself to the file system;

a partition manager coupled to the file system and the system memory, wherein the partition manager is configured to discover an error in a storage partition of the file storage system, the error indicating that the storage partition having a portion of the file system that is not available, find an external backup storage partition containing data corresponding to that of the error storage partition including the identification metadata, wherein the external storage partition is among a plurality of storage partitions to find the external backup storage partition containing the data, wherein the identification metadata is used to identify backup storage partition corresponding to that of the error storage partition, and wherein the error storage partition and the backup storage partition can be individually shut down or powered up; and restore the error storage partition using the backup storage partition, wherein the storage system is a deduplicated storage system that stores a reference to a previously stored data segment upon receiving a new data segment when the new data segment has already been stored in the storage system.

16. The system of claim 15, wherein the partition manager is further configured to generate an alert and log an error message identifying the error storage partition.

17. The system of claim 15, wherein the backup storage partition is located at a different replica site and replicating restoring the error storage partition is performed at the different replica site.

18. The system of claim 17, wherein the partition manager is further configured to install the replicated backup storage partition using the identification metadata at the file storage system after it is received from the different site.

19. The system of claim 17, wherein the storage partition includes namespace metadata identifying files of the file storage system in the storage partition and in other storage partitions and wherein the partition manager in restoring the error partition restores the namespace metadata.

\* \* \* \* \*